United States Patent
Coughlan et al.

(10) Patent No.: US 7,668,304 B2
(45) Date of Patent: Feb. 23, 2010

(54) DISPLAY HIERARCHY OF PARTICIPANTS DURING PHONE CALL

(75) Inventors: Marc William Joseph Coughlan, Sydney (AU); Alexander Quentin Forbes, Westleigh (AU); Peter D. Runcie, Bilgola Plateau (AU); Alexander Martin Scholte, Phegans Bay (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 920 days.

(21) Appl. No.: 11/339,913

(22) Filed: Jan. 25, 2006

(65) Prior Publication Data

US 2007/0172047 A1    Jul. 26, 2007

(51) Int. Cl.
    *H04M 3/42* (2006.01)
(52) U.S. Cl. ............... 379/202.01; 379/201.02; 704/246
(58) Field of Classification Search ........... 379/88.01, 379/201.02, 202.01, 203.01, 204.01, 205.01, 379/206.01; 370/259–270; 704/246, 247; 709/204
    See application file for complete search history.

(56) References Cited

U.S. PATENT DOCUMENTS

| | | |
|---|---|---|
| 4,791,660 A | 12/1988 | Oye et al. |
| 5,164,992 A | 11/1992 | Turk et al. |
| 5,280,561 A | 1/1994 | Satoh et al. |
| 5,506,872 A | 4/1996 | Mohler |
| 5,675,376 A | 10/1997 | Andersson et al. |
| RE36,041 E | 1/1999 | Turk et al. |
| 5,986,703 A | 11/1999 | O'Mahony |
| 6,507,356 B1 | 1/2003 | Jackel et al. |
| 6,574,469 B1 | 6/2003 | Xiang et al. |
| 6,628,767 B1 | 9/2003 | Wellner et al. |
| 6,721,712 B1 | 4/2004 | Benyassine et al. |
| 6,731,734 B1 | 5/2004 | Shaffer et al. |
| 6,753,900 B2 | 6/2004 | Runcie et al. |
| 6,853,716 B1 * | 2/2005 | Shaffer et al. ......... 379/202.01 |
| 2002/0061131 A1 | 5/2002 | Sawhney et al. |
| 2002/0113862 A1 | 8/2002 | Center, Jr. et al. |
| 2004/0221037 A1 * | 11/2004 | Costa-Requena et al. ... 709/225 |
| 2004/0252676 A1 | 12/2004 | Bye |
| 2005/0207554 A1 | 9/2005 | Ortel |

FOREIGN PATENT DOCUMENTS

| | | |
|---|---|---|
| EP | 0 118 182 | 9/1985 |
| EP | 0762717 | 3/1997 |
| EP | 0659006 | 6/1998 |
| JP | 401221086 A | 9/1989 |
| JP | 404344788 A | 12/1992 |

(Continued)

OTHER PUBLICATIONS

U.S. Appl. No. 10/459,182, filed Jun. 10, 2003, Chan et al.

(Continued)

*Primary Examiner*—Creighton Smith
(74) *Attorney, Agent, or Firm*—Sheridan Ross P.C.

(57) ABSTRACT

The present invention is directed toward methods and systems for providing advanced features to a telecommunication device. The systems and methods determine a hierarchical relationship of participants of a conference call and when one participant is communicating with another participant, the parties are made aware of their hierarchical relationship relative to each other.

20 Claims, 5 Drawing Sheets

FOREIGN PATENT DOCUMENTS

WO 00/72560 A1 11/2000

OTHER PUBLICATIONS

U.S. Appl. No. 10/941,199, filed Sep. 14, 2004, Beck.
U.S. Appl. No. 10/949,781, filed Sep. 24, 2004, Lang et al.
U.S. Appl. No. 11/025,493, filed Dec. 28, 2004, Chan et al.
U.S. Appl. No. 11/080,763, filed Mar. 14, 2005, Coughlan et al.
U.S. Appl. No. 11/105,604, filed Apr. 13, 2005, Ohrstrom Sandgren et al.
CDM Optics, "Image Gallery," (2001).
Cisco Systems—Survivable Remote Site IP Telephony, Copyright 1992-2003, Cisco Systems, Inc., http://www.cisco.com/warp/public/cc/pd/unco/srstl, 1 page.
Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4.
Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).
Cisco Systems, Inc., "Cisco VT Advantage Video Telephony Solution," (1992-2004), pp. 1-6.
Cisco Systems Solutions Guide—"Survivable Remote Site Telephony Cisco 2600/3600 Voice Technical Marketing" Copyright 1992-2001, Cisco Systems, Inc., pp. 1-19.
Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008...(5 pages).
Digibird.com, "Essential Optics for Digiscoping," (2002), available at http://www.digibird.com/primerdir/primer0.htm, 4 pages.
Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.
Fintzel et al., "Real Time 3D Navigation in a Static Virtualzied Scene from a Limited Set of 2D Data," IEEE Int'l Conf. on Multimedia & Expo 2000, New York, Electronic Proceedings, 11 pages.
Imagis Technologies Inc. News Release, "Imagis Technologies Releases Major Upgrade to Face Recognition Software," (Sep. 2002).
Jun, Song F. et al., *Optical Feature Recognition*, (Mar. 6, 1995), 1 page.
Kawato et al., *Image and Vision Computing*, "Detection and Tracking of Eyes for Gaze-camera Control," 22(12):1031-1038, Mar. 2004.
LMS, Blind Source Separation, 4 pages at http://www.Int.de/LMS/research/projects/BSS/index.php?lang=eng, printed Dec. 29, 2004.
Lucent Technologies Merlin Legend Communications System, Release 6.1, Network Reference, 555-661-150 Comcode 108289703; Issue 1, Aug. 1998; 369 pages.
Mark et al., "Post-Rendering 3D Warping", In Proceedings of 1997 Symposium on Interactive 3D Graphics, Providence, RI, Apr. 27-30, 1997, pp. 7-16.
Marpe et al., "Video Compression Using Context-Based Adaptive Arithmetic Coding," Proc. IEEE International Conference on Image Processing (ICIP'01), vol. III, pp. 558-561, Oct. 2001.
Nikon MicroscopyU: Interactive Java Tutorials website, "Digital Camera Resolution Requirements for Optical Microscopy," (2000-2004), available at http://www.microscopyu.com/tutorials/java/digitalimaging/pixelcalculator, 4 pages.
"Nordic Guide to Video Telephony and Video Relay Service," The Nordic Forum for Telecommunication and Disability 2002, NFTH Mar. 2002, pp. 1-14.
Oshima, Shigeru, "Acquisition: Fundamental Optics of Television Camera Lenses," shortened version of the Fundamental Optics section in *Canon Guidebook of Television System Optics* ($2^{nd}$ Ed. ), (Jan. 2000), 13 pages.
Peter Kauff Projects, "BS-Immersive Media & 3D Video Group," (Ed. Christoph Fehn, Nov. 12, 2002), 6 pages.
Sanyo Electric Co., Ltd., "Character and Image Recognition Technology," Technology R&D Headquarters (2003), available at http://www.sanyo.co.ip/R_and_D/english/theme/c-2.html, 2 pages.
The Imaging Source website, "Introduction to Optics and Lenses," (2003), available at http://www.theimagingsource.com/prod/opt/opticsintro_2.htm, 10 pages.
Toshiba Corporation Press Release, "Toshiba Announces World's First Image Recognition LSI for Intelligent Vehicle System," (Feb. 6, 2001), available at http://www.toshiba.co.ip/about/press/2001_02/pr0602.htm, 3 pages.
Wolberg, George, "Digital Image Warping," IEEE Computer Society Press Monograph (Mar. 4, 2002), available at http://www-cs.ccny.cuny.edu/~wolberg/diw.html, 7 pages.
First Office Action (including English translation) Issued by the Chinese Patent Office for CN Patent Application No. 200710002284.8, dated Jun. 26, 2009.
"Japanese Titles", Japanese titles- Wikipedia, the free encyclopedia, available at http://en.wikipedia.org/wiki/Japanese_titles, printed Jan. 3, 2006, pp. 1-5.
Official Action from German Patent Office (including English translation) for German Patent Application No. 10 2007 004 538.9-31, mailed Jun. 2, 2008.
Notice of Allowance from Korean Intellectual Property Office (including English translation) for Patent Application No. 2007-8077, dated Jan. 1, 2008.
Background for the above captioned application (previously provided).

* cited by examiner

| Participant | Title | Company | Address | Relative Rank |
|---|---|---|---|---|
| A | CEO | Acme Co. | Axxxx | 1 |
| B | CFO | Acme Co. | Bxxxx | 1 |
| C | Sales Mngr. | Acme Co. | Cxxxx | 2 |
| D | Sales Assoc. | Acme Co. | Dxxxx | 3 |
| ⋮ | ⋮ | ⋮ | ⋮ | ⋮ |
| N | CEO | Baker Co. | Nxxxx | 1 |

DISPLAY HIERARCHY OF PARTICIPANTS DURING PHONE CALL

FIELD

The invention relates generally to providing advanced features for a phone. Specifically, embodiments of the present invention allow a participant of a call to know who is talking to them and what is the speaker's hierarchical relationship relative to the participant's hierarchical position.

BACKGROUND

Communication networks, such as the Public Switched Telephone Network (PSTN), for transporting electrical representations of audible sounds from one location to another are well known. Additionally, packet switched networks, such as the Internet, are able to perform a similar function by transporting packets containing data that represents audible sounds from one location to another. The audible sounds are encoded into digital data and placed into packets at the origination point and transmitted across the packet switched network. At the destination point, the digital data is extracted from the packets and decoded into audible sounds.

In a communication network, it is desirable to provide conference arrangements whereby many participants can be bridged together on a conference call. A conference bridge is a device or system that allows several connection endpoints to be connected together to establish a communications conference. Modern conference bridges can accommodate both voice and video data, thereby allowing, for example, collaboration on documents by conference participants.

In a conference call, the audible sounds received at a device, usually a telephone, are distributed to all of the other devices participating in the conference call. Thus, each participant in the conference call may share information with all of the other participants.

Unfortunately, during a conference call, it may be difficult for a participant to determine who is speaking unless he/she is familiar with the voices of all other participants. Furthermore, the "rank" of the person speaking may be even more difficult to establish unless a listener knows all positions held by all of the other participants.

There have been attempts to correct the problem of identifying speakers during a conference call. For example, in U.S. Pat. No. 6,853,716 to Shaffer et al., which is herein incorporated by this reference, a system and method are described that identifies a speaking participant during a conference call by analyzing his/her voice characteristics. Once the speaking participant is identified, his/her information is determined and displayed to all other participants of the conference call who are receiving the voice signal. This is particularly useful when more than one participant is using one endpoint (telephone). However, this architecture fails to provide the relative rankings of the various participants on an absolute basis. Although titles of each participant are displayed, the meaning of the title is often unknown to the other participants. For example, different cultures use different titles for the same position or the same titles for different positions.

In very formal societies like Japan and Korea, it is necessary to know the rank of a person before addressing him/her as a different form of formal address is used depending upon the rank and possibly age of the person. Even in English speaking countries the knowledge of another person's rank can be important as very distinct persons are addressed formally. Addressing someone before his/her ranking is known may lead to an unintentional insult of the person being addressed.

Furthermore, the importance of a directive/information is often related to the rank of the person delivering the directive/information. In military applications, where rank is of the utmost importance, an order given by a general needs to be addressed differently than an order given by a corporal. Like most business entities, the military is driven by the chain of command. Other participants of the conference need to know exactly who gave the order and what his/her ranking is relative to them. Particularly because an individual ranking just under the general, say a colonel or major, will need to pass the order received from the general down to lower ranking subordinates. Other generals that are participating on the conference may not need to pass the order on to their subordinates. Likewise, an order given by a sergeant is typically not directed toward individuals ranking higher than the sergeant. Without knowing the hierarchical position of the speaker, listeners may not now how to handle certain instructions.

SUMMARY

The present invention is directed generally to an architecture for providing hierarchical information to conference call participants during the course of a conference call. The hierarchical information indicates the relative positions of authority of each of the participants.

In a first embodiment of the present invention, a method is provided that includes the steps of:

(a) connecting first and second telecommunication devices to create a live conference call, the first and second telecommunication devices being associated, respectively, with first and second participants;

(b) determining characteristics of each of the first and second participants;

(c) creating a hierarchal structure of the first and second participants based upon their respective determined characteristics; and (d) during the live conference call, providing the hierarchical structure to one or both of participants.

The hierarchical structure can include an indicator of the relative positions of authority of each participant. Suitable indicators include a hierarchical ranking, a rank value, a hierarchical chart showing differing levels or relative positions of authority, and the like. For example, if the first participant has a first hierarchical ranking and the second participant a second lower hierarchical ranking, the hierarchical structure indicates the relative values of the first and second hierarchical rankings.

The hierarchical structure can take many forms. If a large display is present, the entire organizational hierarchy of each of the participants can be displayed. The hierarchy includes not only the participant but also the participant's superiors and, in some cases, peers and inferiors. In this configuration, the conference participant is highlighted or otherwise indicated to the other participants. The structure can include the whole hierarchy of only the participants, regardless of their respective organizations. In this structure, non-participants are generally not included. The currently speaking participant is highlighted or otherwise indicated to the other (non-speaking) participants. If only a small display is available, the structure may include only an indication of the rank of each participant or, in very small displays, only the current speaker. In any of the above, display configurations, the display can take many forms, such as a tree-structure, disconnected or interconnected bubbles, list, and the like. A visual indicator can change color depending on the rank of each participant. If no display is available, the rank can be automatically "whispered" (or provided to one or more participants in a side tone or channel). Each participant can receive the hierarchical structure of the other participant but not his or her own.

The characteristics may include a variety of information including participant identity, title, age, sex, ethnicity, country of citizenship, country of residence, electronic address, company of employment, role within a project, employment status, and the like. This information can come from many sources including an HR database from a company facilitating the conference call, a switch/server that is currently handling the speaking participant's communication line, a database from a company who has participants in the conference call, a global database, a database from a personal computer, an email account database, and/or an LDAP directory or similar source of hierarchical information.

In one configuration, the hierarchical structure includes first and second hierarchical ranking values. The indicator is thus different from a corresponding title of each of the participants. The structure may include, however, a variety of information, such as the identity and job title of each of the first and second participants. The reporting hierarchy of the person may also be displayed.

In one configuration, the hierarchical structure includes a recommendation on the proper way to address the first participant.

The hierarchical structure may indicate when the first participant is speaking and when the first participant is not speaking.

The hierarchical structures provided to each of the participants may be different. For example, the structures may be participant-configurable.

The present invention can provide advantages over the prior art. For example, it assists conference participants in addressing other participants properly and in evaluating the importance of directives or other information spoken by each participant. The display of all of the participants can be generated automatically and be limited to only the participants or the whole organization. Such options can be configurable by each participant.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having a conference bridge or other similar conferencing hardware, the invention is not limited for use with any particular type of communication system or configuration of system elements. Specifically, embodiments of the present invention may be suitable for use with video calls and/or in a videoconferencing environment. Those skilled in the art will recognize that the disclosed techniques may be used in any communication application in which it is desirable to determine and display the hierarchical relationship of participants of a conference call.

As used herein a "conference call" is a communication between two or more individuals. Although most conference calls take place between three or more participants, unique aspects of the present invention may be utilized in a point-to-point communication as well as communications between many participants.

Figure 1:
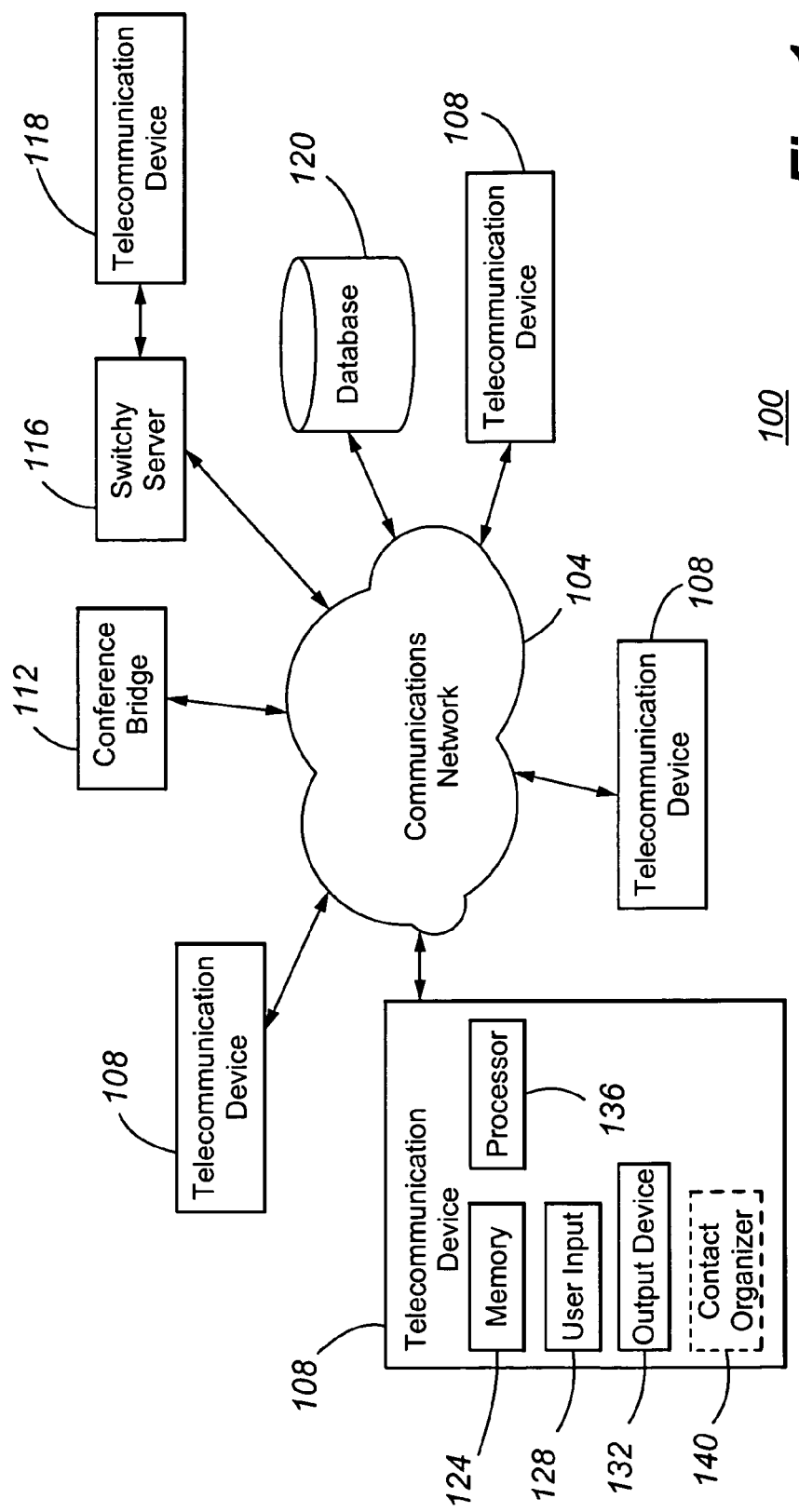
FIG. 1 is a block diagram depicting a communication network in accordance with embodiments of the present invention.

Referring initially to FIG. 1, an exemplary communication system 100 will be described in accordance with embodiments of the present invention. The communication system 100 generally comprises a communications network 104 (e.g., a packet switched network and/or a circuit switched network), a plurality of telecommunication devices 108, a conference bridge 112, a switch/server 116, and a database 120.

The communications network 104 can be any data and/or distributed processing network, such as a PSTN, the Internet, or an enterprise network. The network 104 typically includes proxies (not shown), registrars (not shown), and routers (not shown) for managing packet flows in the case of a packet-switched network.

The switch/server 116 is part of an enterprise network that includes the telecommunication device 118. The term "switch" or "server" as used herein should be understood to include a PBX, an ACD, an enterprise switch, an enterprise server, Interactive Voice Response (IVR) server, or other type of telecommunications system switch or server, as well as other types of processor-based communication control devices such as media servers, computers, adjuncts, etc. The telecommunication device 118 is "internal" in that it is directly supported as a telecommunication endpoint by the switch/server 116. The telecommunication device 118 is an example of a device more generally referred to herein as an "internal endpoint" that is used by a subscriber to the enterprise network of which the switch/server 116 is a part.

The database 120 is a device that is operable to store information about various potential participants of a conference call. If the database 120 is located in an enterprise network, then typically information for each employee of the enterprise may be stored in the database 120 (e.g., name, title, extension, voice characteristics, and the like.) The database 120 may also contain global information for potential participants of a conference call. For example, participants of a future conference call may load their identification information into the database 120 prior to participating in the conference call. Alternatively, such information can be obtained from a presence server affiliated with each participant. This way the required hierarchical information can be determined for each participant during the conference call. The database 120 may also be a nationwide directory that can be accessed when a conference call is initiated. As can be appreciated the database 120 may be integral to the switch/server 116 or may be separated therefrom, as depicted. The database 120 may also be a representation of multiple databases. For example, Company A may allow Company B to read from its database for purposes of displaying hierarchical information during calls. Especially if the conference call is being bridged by Company B and/or participants from Companies A and B are present.

The telecommunication devices 108 and 118 generally comprise a memory 124, a user input 128, an output device 132, a processor 136, and an optional contact organizer 140. A telecommunication device 108 and 116 may also include a communication interface (not shown) that is adapted to send information to and receive information from the communication network 104. A suitable communication interface includes a network interface card, a modem, a transceiver, or any other type of device for sending information to and receiving information from the communications network 104. Unlike the telecommunication device 118, the telecommunication devices 108 are referred to as "external" in that they are not directly supported as telecommunication device endpoints by the switch/server 116 and may be used by subscribers or non-subscribers to the enterprise network. The telecommunication devices 108 are an example of devices more generally referred to herein as "external endpoints." As will be appreciated, any of the components of the telecommunication devices, such as the contact organizer 140, may be included in the switch/server 116 rather than in the internal endpoints to the switch/server 116.

The memory 124 includes logical instructions for the processor 136 to perform as well as memory storage buffers. The memory 124 may be any type of memory including Random Access Memory (RAM), Read Only Memory (ROM), Dynamic RAM (DRAM), Flash Memory, Electronically Programmable ROM (EPROM), and the like. Information relating to the conference call may be forwarded to the telecommunication device 132 and stored in the memory 124. The information stored may simply list the participants of the conference call or may be a more complete list outlining each participant, his/her title, and relative ranking compared to other participants. The processor 136, using routines stored in the memory 124, operates, at least in part, to generate output based on data received from the communications network 104 and/or prepare signals received by the user input 128 for transmission across the communications network 104. The processor 136 may be a Reduced Instruction Set Computer (RISC), a Complex Instruction Set Computer (CISC), an Application Specific Integrated Circuit (ASIC), or other type of processing equipment.

The contact organizer 140 may be in the form of logical instructions stored in the memory 124 or may be a separate processor as depicted. The contact organizer 140 is operable to receive data relating to participants of a conference call and, based on that information, organize a hierarchical structure of all participants. The contact organizer 140 is further operable to determine a hierarchical ranking of a speaker during the conference call and relay that information to the user of the telecommunication device 108 through the output device 132.

The user input 128 is typically a signal-receiving unit like a voice transducer or microphone. The user input 128 may also be a touchtone keypad, touch screen, mouse, or other types of user input devices.

The output device 132 is operable to convert the data representing audible sounds into a format intelligible to a user of the telecommunication device 108. The output device 108 may also comprise a visual display as an output device 132 that shows a user the hierarchical ranking of a person who is currently speaking. The output device 132 may be in the form of a speaker, a Liquid Crystal Display (LCD) screen, a set of Light Emitting Diodes (LEDs), a single LED, an up arrow and/or down arrow, a Cathode Ray Tube (CRT) display, or other type of mechanism able to articulate information to a user of the telecommunication device 108.

The telecommunication devices 108 may be packet-switched in a packet-switched network and can include, for example, IP hardphones such as Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and Interactive Voice Response (IVRs), and packet-based traditional computer telephony adjuncts.

The telecommunication devices 108 may also be circuit-switched in a circuit-switched network. Circuit-switched telecommunication devices 108 can include, for example, wired and wireless telephones, PDAs, H.320 videophones and conferencing units, voice messaging and response units, and traditional computer telephony adjuncts.

In operation, the telecommunication device 108 receives data representing audible sound from the communications network 104 and messages containing at least identification information and possibly hierarchical ranking information associated with the received sound data. In particular embodiments, the processor 136 may have to associate packets of received sound data with packets of received identification and/or hierarchical information using, for example, time stamps. Upon receiving the sound data, the processor 136 performs any necessary processing on the data, such as, format conversion and/or decoding, and conveys the data to the output device 132. The output device 132 generates signals, audible, visual, or combinations thereof that are intelligible to a user of the telecommunication device 108 and processes the identification and/or hierarchical information in a similar manner.

The telecommunication devices are further operable to send data representing audible sounds to other participants of the conference call. The user input 128 detects the audible sounds emitted by the participant and converts them into electrical signals that can be processed by the processor 136. The processor 136 then performs any necessary processing on the data, such as, format conversion and/or encoding, and forwards the signal on to the communications network 104 for transmission to all other participants of the conference call.

The communications network 104 is in communication with the external telecommunication devices 108 either directly or via routing devices (not shown). The telecommunication devices 108 and 118 are an example of devices more generally referred to herein as "endpoints."

Users of the external and internal endpoints may wish to communicate with one another across the communication network 104. In the event that a simple point-to-point connection is desired, the two subject endpoints are directly connected by hardware within the communications network 104 and a single communication path is established. However, when several users of the external endpoints wish to conference with each other simultaneously, the conference bridge 112 is typically employed. The conference bridge 112 connects each channel from each endpoint participating in the conference call such that every participant of the conference call can hear what any one of the other participants is saying at a given time. This is accomplished by a number of mechanisms. One such mechanism is the received signals from every endpoint are summed together into a single outgoing signal for each participant. Each participant's received signal is never added to (or subtracted from) the summed signal from the summed signal that a given participant will receive. Specifically, if three parties A, B, and C are joined in a conference call, the signals from parties A and B are summed and sent to party C, the signals from parties A and C are summed and sent to party B, and the signals from parties B and C are summed and sent to party A. This is typically accomplished by having each channel of the conference bridge 112 have its own mixer (summation point).

Another way this is accomplished is that the conference bridge 112 may include software and/or hardware that can determine what parties are speaking and automatically sends that signal to all other participants of the conference call. The determination can be made for instance by voice recognition software, channel activity detection, or the like. This requires a little more processing power in the conference bridge 112 and is typically used less frequently for this reason.

It should be emphasized that the configuration of the switch, server, user telecommunication devices, and other elements as shown in FIG. 1 is for purposes of illustration only and should not be construed as limiting the invention to any particular arrangement of elements. For example, the conference bridge 112 logic may be included in the switch/server 116 or be configured as an adjunct to the switch/server 116.

Figures 2, 3:
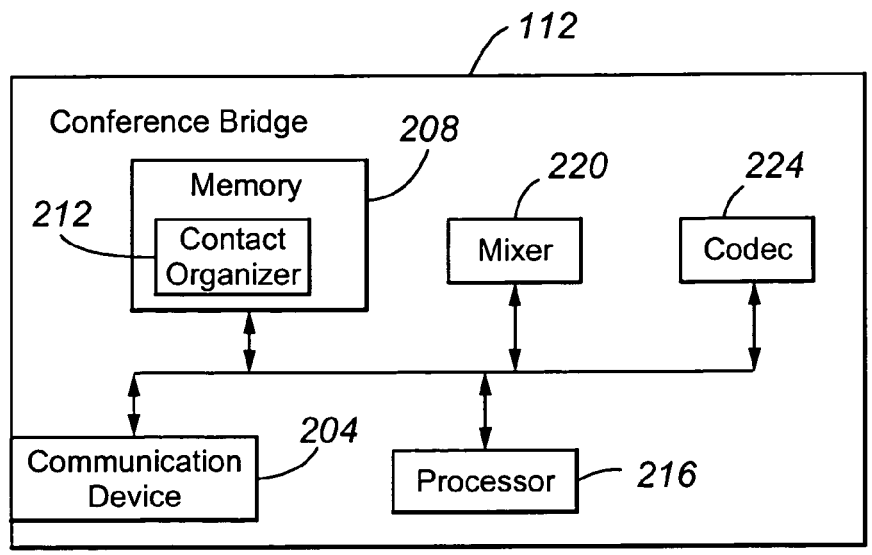
FIG. 2 is a block diagram depicting an exemplary conference bridge in accordance with embodiments of the present invention.
FIG. 3 is a representation of a data structure employed in accordance with embodiments of the present invention.

Referring now to FIG. 2, an exemplary conference bridge 112 will be described in accordance with embodiments of the present invention. In the illustrated embodiment, the conference bridge 112 comprises a communication interface 204, a memory 208 having a contact organizer function stored thereon 212, a processor 216, a mixer 220, and at least one codec 224 (for use in packet-switched networks). The communication interface 204 of the conference bridge 112 is typically a set of channels, each of which may be used by a different endpoint during a conference call. The communication interface 204 is adapted to receive sound data from one of the channels and provide it to the processor 216 for additional processing.

Once the processor 216 has received the sound data from a channel it used the codec 224 to decode and format the sound data such that it can be processed by other components in the conference bridge 112. The processor 216 then uses functions stored on the memory 208 to determine what person is associated with the sound data. The processor 216 may include a digital signal processor (DSP) if digital signals are being utilized. Voice identification may be used to determine who is talking or the channel used by the endpoint to connect with the conference bridge 112 may identify the person. Participant identification information, possibly including hierarchical ranking information, may be stored and retrieved from the database 120 as noted above, or the information may be stored on the memory 208 upon initialization of the conference call. The processor 216 accesses the identification information and possibly the hierarchical ranking information, wherever it resides, and associates it with the sound data that it has just received. The processor 216 then sends the sound data to the mixer 220 to be summed with all other sound data. The summed signal is then forwarded to the codec 224 to be encoded, if necessary, and formatted for transmission across the communications network 104. The properly formatted summed signal, along with identification and/or hierarchical ranking information, is sent to the communication interface 204 where it is transmitted to each participant on their own channel.

Referring now to FIG. 3, the initialization of a conference call and population of a hierarchical data structure 300 will be described in accordance with embodiments of the present invention. Before the conference bridge 112, switch/server 116, or telecommunication device 108 are able to use the hierarchical ranking information discussed herein, the conference call is initiated and participant information is organized by at least one of the above-noted devices. When a conference call is planned ahead of time, the participant information may also be generated prior to the conference call. However, typically a conference call is initiated by one or more participants connecting with the conference bridge 112 using their respective telecommunication devices 108. Of course a conference call between two participants is initiated when one user calls the other user. When a participant calls is connected to the conference bridge 112, the conference bridge 112 determines if that participant's information is stored in memory 208. If the participant's information is not stored in memory 208, the conference bridge 112 either directly, or through the switch/server 116, queries the database 120 for the participant's information. As additional participants connect to the conference bridge 112, information for each participant is retrieved in a similar fashion. As participants are added to the conference call the conference bridge 112, utilizing the contact organizer 212, ranks each participant according to some predetermined criteria. Participants may be ranked according to, for example, age, company, position/title, job description, role, employment status (e.g., full-time, part-time, contractor), etc. The conference bridge 112 begins to populate fields of the data structure 300. The participant's name is inserted into the name field 304. The title held by the participant at his/her respective company is stored in the title field 308. The company information is stored in the company field 312. The address that the participant is using is stored in the address field 316 and the relative rank of the participant is stored in the relative rank field 320. The address information 316 may correspond to an extension number of the endpoint, an IP address, or the channel number that connects the endpoint to the conference bridge 112. As can be appreciated, more or less data fields may be utilized depending upon the type of information that is desired.

Figure 4:
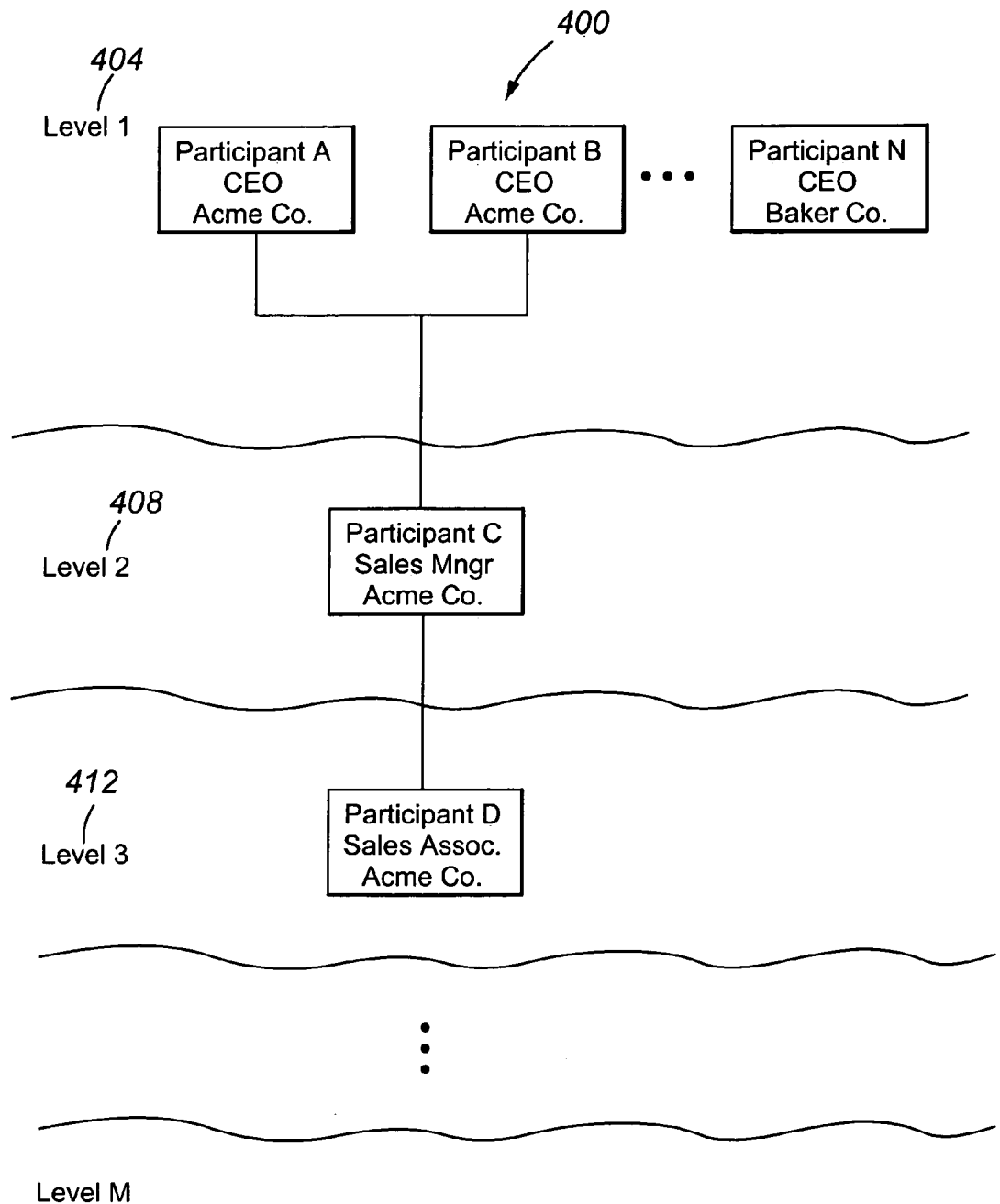
FIG. 4 is a block diagram depicting a hierarchical relationship of participants of a conference call in accordance with embodiments of the present invention.

Referring now to FIG. 4, the creation and use of a hierarchical structure 400 during a conference call will be described in accordance with embodiments of the present invention. Once the participants' information has been recovered, and the contact organizer 212 has provided each participant a relative ranking, a hierarchical structure 400 can be formed. The hierarchical structure 400 sets each participant at a particular hierarchical level depending upon his/her determined ranking. For example, the highest-ranking participants (e.g., the CEO's and CFO's of any particular company) may be placed in the first level 404. The second highest-ranking participants (e.g., middle to upper level managers) are placed in the second level 408. The next highest-ranking participants (e.g., associates and other non-management personnel) are placed in the third level 412 and lower ranking participants are placed in lower levels up to M levels. There may be only one level occupied by participants of a conference call, in which case every participant has the same relative ranking as all other conference participants. This results in an "equal"

display to all participants whenever any other participant is talking. An "equal" display simply shows a participant receiving a voice signal that the speaking participant has the same ranking as him/her. For example, if Participant A is speaking, then Participant B will receive an "equal" display on his/her telecommunication device. Whereas, when Participant A is speaking, Participants C and D will receive a "higher" display on their telecommunication devices indicating that the person speaking has a higher ranking than him/herself. If Participant C responds to what Participant A said, Participant A (and Participants B and C) will receive a "lower" display on they telecommunication devices indicating that the person speaking has a lower ranking them themselves.

Equal, higher, and lower displays can be presented to participants in numerous ways. For example, once the conference bridge 112 has prepared the hierarchical structure 400, the hierarchical structure 400 may be forwarded to each participant's telecommunication device 108 and stored in memory 124. The hierarchical structure 400 may be continuously displayed on the output device 132. Each participant's respective position on the hierarchical structure can be highlighted during the conference. For example, Participant C's display would have the second level 408 highlighted. Then when another person speaks, the level where the speaking participant is assigned may also be highlighted, thus indicating the hierarchical relationship of the speaker to the signal recipient. In other words, if Participant A, B, or C is speaking, then the first level 404 would be highlighted for all of the participants, whereas if Participant D is speaking, then the third level 412 would be highlighted. An "equal" display under such a configuration might result in a change in the type of highlighting. For instance, Participant A's display may continuously have the first level 404 highlighted in yellow, then if Participant B or C speaks, the first level 404 becomes highlighted in orange. The shading of the highlight may also change. As can be appreciated, arrows or other types of indications may be used to display to the users what ranking a speaker has in relation to them. For example, a first arrow may indicate to a user where he/she is located in the hierarchical structure 400, and a second different type of arrow may indicate to a user where a speaker is located in the hierarchical structure 400.

Displaying the entire hierarchical structure 400 to a participant is only possible for telecommunication devices 108 with output devices 132 that can display such a structure. Specifically, if a telecommunication device 108 includes an LED as its only form of visual display or has no visual display at all, then other hierarchical display methods should be employed. For example, an LED that can light up different colors may be used to indicate a hierarchical relationship. An equal display may correspond to the LED lighting up yellow, a higher display may correspond to the LED lighting up red, and a lower display may correspond to the LED lighting up green. Of course multiple LEDs may be used, where each one illuminated based upon different hierarchical relationships between the speaker and listener.

Alternatively, a single LED can be blinked at a particular rate depending upon the hierarchical position of the speaker related to the listener. For example, if one participant is listening to another participant who has a higher ranking than him/herself, then an LED on the listening participant's telecommunication device 108 may blink quickly. Whereas, if a participant is listening to a participant with a lower rank than him/herself, then the LED on the listening participant's telecommunication device 108 may blink very slowly. If a participant is listening to another participant with a substantially equal rank to him/herself, then the LED may not blink at all.

In the event that no visual displays are available, the hierarchical ranking information may be relayed to a listener by a series of beeps prior to, or while, listening to a person speak. A single beep may indicate that the speaker is a higher-ranking participant, two beeps may indicate that the speaker is an equal ranking participant, and three beeps may indicate that the speaker is a lower ranking participant. Another possible configuration can send a voice signal to the receiving party while another participant is speaking. The voice signal may literally indicate whether the speaker has a higher, lower, or equal ranking in the hierarchical structure 400.

In one configuration, the display is augmented by recommendations regarding how to address each of the other speakers. The recommendations are frequently dependent on cultural etiquette. For example, while no distinction is normally made when addressing a CFO versus an employee who is not a corporate officer, such distinctions are common in most cultures. The recommendations state how and by whom each conference participant is to be addressed for cultural etiquette to be followed. It can be important not only to use the proper expression to address certain participants but also to have the proper person (typically a person of similar or higher rank) in each affiliated set of participants to address another higher or lower ranking participant in another affiliated set of participants.

For example, in Japan, honorific titles are usually used after a person's name. One such honorific title is San. San is the most common honorific title and is used when addressing most social outsiders, for example, non-family or business members. Another honorific title used in Japanese culture is Kun. Kun is an informal and intimated honorific used primarily to address males. It is also used by superiors in addressing inferiors, by males of roughly the same age and status in addressing each other, and in addressing male children. Additionally, young women may be addressed as kun by older male superiors in a business setting. If a person having a first hierarchical position on a conference call with Japanese participants is listening to a person having a second lower hierarchical position, the display on the first person's telecommunication device might include the recommendation to address the speaker as kun, if such an honorific title is suitable.

Another type of honorific title used in Japanese culture is Sensei. Sensei is typically used to refer to or address teachers, practitioners of a profession such as doctors and lawyers, politicians, and other authority figures. If a Japanese doctor is a participant in a conference then when the doctor speaks, all other participant's telecommunication devices may display the speaker's name, title, and suggested ways of addressing him/her.

Still another honorific title used in Japan is Sama, which is the formal version of san. Sama is primarily used to address persons of much higher rank than oneself. In commercial and business settings, Sama is used to address and refer to customers. In this context, one speaker may be a customer of another participant on a conference call. When the customer is speaking, the customer's name, along with the recommended honorific title of Sama, may be displayed to any participants who have this person as a customer.

Of course there are many other cultures that use different titles and phrases to address people of different and the same hierarchical ranking. The recommendations displayed on a particular communication device may be based on the participants of a given teleconference or it may be based on where the conference is taking place. The recommendations may also be based on the current speaker's culture. For example, one type of recommendation may be displayed for a Japanese speaker having a higher hierarchical ranking, while another type of recommendation may be displayed for a Korean speaker having a hierarchical ranking similar to the Japanese speaker.

The recommendations may be displayed to all or only a subset of participants adjacent to each participant's name in the hierarchical chart. By way of example, the recommendations pertaining to one set of participants may be displayed only to a selected set of unaffiliated participants.

In one configuration, non-participants may be included in the hierarchical chart to show the peers or superiors of each participant. For example, if the President of Company A is on the conference call, the identity of the nonparticipating CFO of Company A may also be shown at a higher ranking level. The CFO would be shown in a font type or color indicating that he or she is not currently a participant on the conference call. A participant may find such information useful. The display of such information may be an option configurable by each participant. Thus, the displays of the various participants may include different information.

Participants of a conference are allowed to join and leave the conference call as they wish. As such, the hierarchical structure 400 may be dynamically updated as participants enter and leave the conference call. The updating of the hierarchical structure may occur when the presence of a new participant is detected, or the conference bridge 112 may periodically determine if the hierarchical structure 400 needs to be updated.

As can be appreciated, the hierarchical structure 400 may be maintained at the conference bridge 112. The conference bridge 112 may reference the hierarchical structure 400 every time a new voice signal is detected to determine the hierarchical ranking of the speaker related to all other participants. The conference bridge 112 may forward the hierarchical relationship on to each participant's endpoint, along with the corresponding voice signal, for the telecommunication device 108 to display to the user.

In an alternative configuration, the conference bridge 112 may create the hierarchical structure 400 and forward that information on to each participant during the conference call initialization. In this configuration, the conference bridge 112 may make the determination of who is speaking and forward that information on to the telecommunication device 108. The telecommunication device 108 may use the hierarchical structure 400 that it received at the outset of the conference call to make a determination of the hierarchical relationship between the speaker and the listener.

In still a further configuration, the telecommunication device may make the determination of who is speaking and may also determine the hierarchical relationship of the speaker to the listener. As can be appreciated, a number of other possible configurations exist that are within the scope of the present invention.

Figure 5:
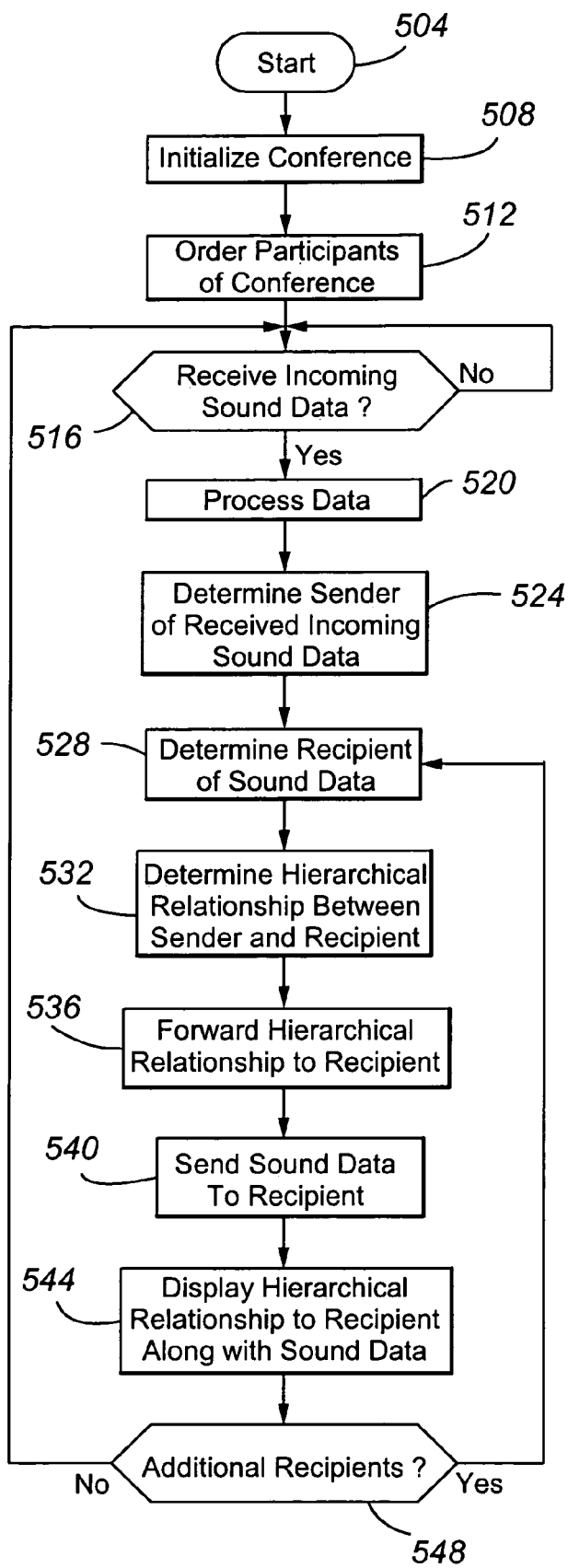
FIG. 5 is a flow chart depicting aspects of the operation of a conference bridge in accordance with embodiments of the present invention in connection with determining and displaying the hierarchical relationship of participants of a conference call.

Referring now to FIG. 5 the operation of a conference bridge 112 and/or a switch/server 116 will be described in accordance with embodiments of the present invention in relation to determining and displaying hierarchical relationships to conference call participants.

In step 504, the process begins then a conference call is initiated in step 508. A conference call is initiated when one endpoint directly dials another endpoint or a number of endpoints each connect to a conference bridge 112. During the conference call initialization, the conference bridge 112 references each participant's relevant information from the database 120. Once each participant's information is determined, the hierarchical structure 400 is determined and the ranking order of each participant is determined in step 512.

In step 516, the conference bridge 112 waits until it detects sound data. If it does not detect any sound, then it continues to wait until one of the participants begins to speak. Once the conference bridge 112 detects sound data, the conference bridge processes the sound data in step 520. The step of processing the sound data may include formatting the data to be sent to other recipients of the conference and may also include a voice signal recognition program, or other type of call identification routine.

In step 524, the sender of the sound data is determined. The sender may be identified by voice recognition or channel association. Once the sender has been identified, the conference bridge 112 determines what participants will receive the sound data in step 528. Typically, every participant of a conference call receives every signal received at the conference bridge 112. However, the conference bridge 112 may send the sound data to a select subset of the participants.

For the first identified recipient, the conference bridge 112 compares the hierarchical position of the sender with the hierarchical position of a first receiver by using the hierarchical structure 400 in step 532. At a minimum the conference bridge 112 determines whether the sender is in a higher, lower, or equal hierarchical position to that of the receiver. The conference bridge 112 may also determine to what degree the hierarchical relationship differs between the sender and the receiver. For example, the difference between the sender's hierarchical level and the receiver's hierarchical level may also be a part of the hierarchical relationship.

In step 536, the hierarchical relationship information is forwarded to the recipient's telecommunication device 108. In step 540, the sound data is also sent to the recipient's telecommunication device 108. The hierarchical relationship information may be sent in the same signal as the sound data or may be sent in a different signal. Further, the sound data may be sent on one channel and the hierarchical information sent via another. In step 544, the hierarchical relationship along with the sound data is displayed to the user of the telecommunication device 108 in an intelligible manner. As described above, there are several ways that the configuration data may be displayed to the user of the telecommunication device.

In step 548, it is determined if additional recipients exist for the received sound data. The sound data and hierarchical data may be sent to all participants in the same set of steps, however, some participants may be using different telecommunication device 108, which are enabled with different features. Thus, the sound and hierarchical data signals would have to be processed differently by the conference bridge 112 prior to sending them to the users. If there are additional recipients, then the conference bridge 112 determines what participants remain and determines what format data must be sent to them in. If there are no additional recipients, then the process returns to step 516 to wait for more sound data.

Figure 6:
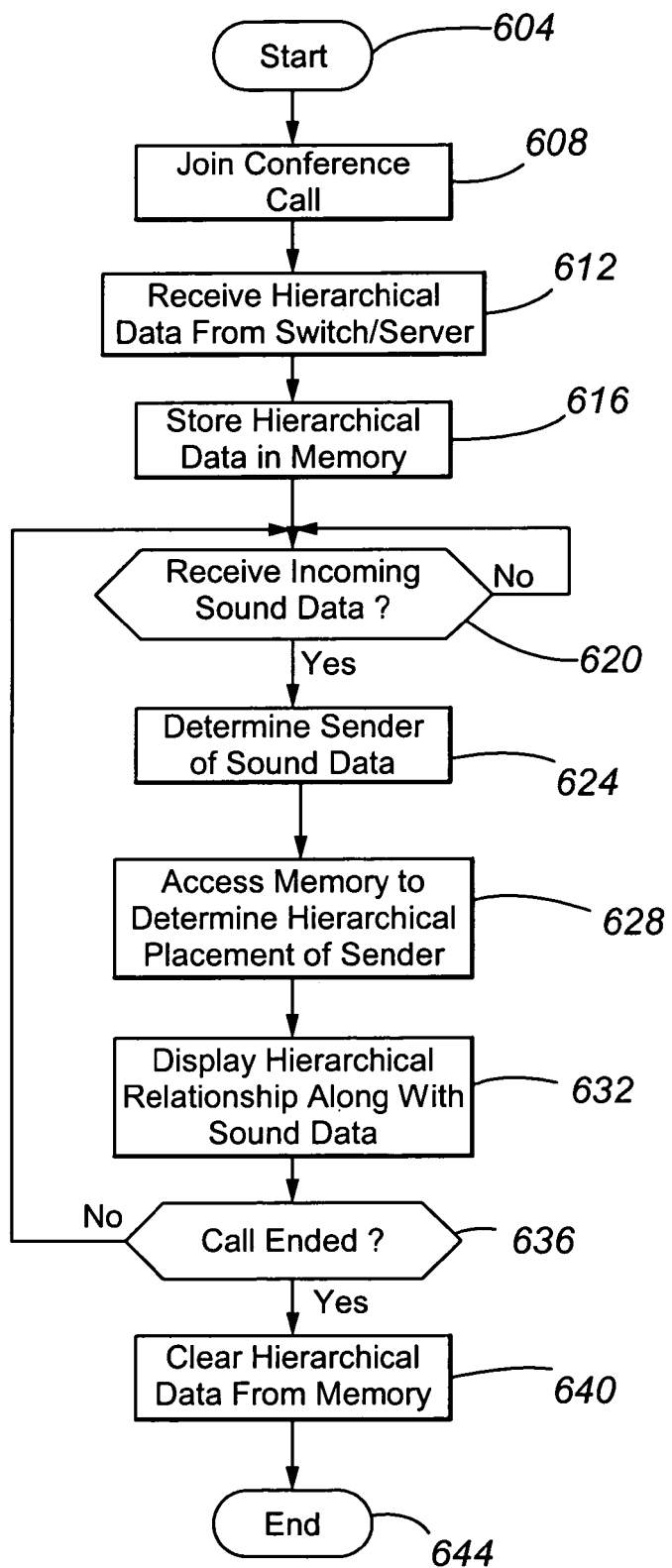
FIG. 6 is a flow chart depicting aspects of the operation of a communication endpoint in accordance with embodiments of the present invention in connection with determining and displaying the hierarchical relationship of participants of a conference call.

Referring now to FIG. 6, the operation of a telecommunication device 108 will be described in accordance with embodiments of the present invention in relation to determining and displaying hierarchical relationships to conference call participants.

In step 604, the process begins, and then in step 608 the telecommunication device 108 joins the conference call. The telecommunication device 108 may join the conference call by connecting directly to the conference bridge 112 through an outbound call or may receive a call from a participant already connected to the conference bridge 112.

In step 612, the telecommunication device 108 receives hierarchical data related to all participants of the conference call. The hierarchical data may be sent directly from the conference bridge 112 or may be sent from the switch/server 116. The hierarchical data may be in a form of the hierarchical structure 400 or may simply be a listing of participant names and their relative ranking. The telecommunication device 108 stores the hierarchical data in its memory 124 in step 616. By maintaining the hierarchical data at the telecommunication device 108, the conference bridge 112 will not have to send hierarchical data across the communications network 104 every time a new speaker is identified. Rather, the conference bridge 112 will only need to determine who is talking and send that information across the communications network 104. In another configuration, the conference bridge 112 may just send the sound data without making any determination about the sender's identity.

Of course the switch/server 116 does not necessarily have to send the hierarchical data to the telecommunication device 108 at the onset of the conference. The switch/server 116 may also send the hierarchical information, sometimes in the form of the hierarchical structure 400, to the telecommunication device 108 every time a different person speaks. The hierarchical information as it relates to the speaker may be sent to each telecommunication device 108 when that person is speaking. Then when that person is no longer speaking, the telecommunication device 108 can purge that hierarchical information and wait for new information related to a different speaker.

Once the telecommunication device 108 has the hierarchical information stored in its memory, it waits for incoming sound data in step 620. Once the telecommunication device 108 receives the sound data, it determines who the sender of the sound data was (e.g., who is speaking) in step 624. The telecommunication device 108 may have this information sent to it from the conference bridge 112 or the switch/server 116. However, the telecommunication device 108 may also identify the speaker.

In step 628, the telecommunication device 108 accesses the hierarchical data in memory 124 to determine the hierarchical relationship of the sender compared to the receiver. If the telecommunication device 108 is associated with more than one user, the determination of a hierarchical relationship may be made between the highest ranking user of that endpoint and sender, the lowest ranking user of that endpoint and the sender, or other variations thereof.

In step 632, the telecommunication device 108 displays the hierarchical relationship to the user along with the sound data. As noted above, the display of the hierarchical information depends upon the type of output device 132 the telecommunication device 108 has.

In step 636, the telecommunication device 108 determines if the conference call has ended. If the call has not ended, the process returns to step 620 and the telecommunication device 108 continues to wait for additional sound data. However, if the conference call has ended (e.g., the device has been disconnected from the conference bridge 112), the telecommunication device 108 clears the hierarchical data from its memory 124 in order to conserve memory space for later use. Then the process ends in step 644.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of enhancing a conference call, comprising:
    (a) connecting first and second telecommunication devices to create a live conference call, the first and second telecommunication devices being associated, respectively, with first and second participants;
    (b) determining characteristics of each of the first and second participants;
    (c) creating a hierarchal structure of the first and second participants based upon their respective determined characteristics, wherein the first participant has a first hierarchical ranking and the second participant a second hierarchical ranking, and wherein the hierarchical structure indicates the relative values of the first and second hierarchical rankings; and
    (d) during the live conference call, providing the hierarchical structure to at least the second participant.

2. The method of claim 1, wherein the hierarchical structure comprises the first and second hierarchical rankings and wherein the first and second hierarchical rankings are different from a corresponding title of each of the participants.

3. The method of claim 1, wherein the hierarchical structure is displayed to the second participant and wherein the hierarchical structure comprises an identity and title of each of the first and second participants.

4. The method of claim 2, wherein the hierarchical structure comprises a recommendation on the proper way to address the first participant.

5. The method of claim 1, wherein the hierarchical structure indicates when the first participant is speaking and when the first participant is not speaking.

6. The method of claim 1, further comprising:
(e) during the live conference call, simultaneously providing the hierarchical structure to the first participant.

7. The method of claim 1, wherein step (d) comprises:
(d1) during the live conference call, displaying a first hierarchical structure to the first participant; and
(d2) during the live conference call, displaying a second hierarchical structure to the second participant, wherein the first and second hierarchical structures are different.

8. A computer readable medium comprising processor executable instructions to perform the steps of claim 1.

9. A communication device, comprising:
(a) an interface for sending across and receiving voice data from a communications network;
(b) a memory coupled to the interface operable to store information relating to characteristics of participants of a conference call; and
(c) a contact organizer operable to process the information relating to characteristics of the participants of the conference call such that a hierarchical relationship is created between each of the participants of the conference call based upon the characteristics of each of the participants, the hierarchal structure indicating the relative rankings of each of the conference call participants and wherein the relative rankings are indicated using an indicator other than the titles of the conference call participants.

10. The device of claim 9, wherein first and second participants are on the conference call, wherein the first participant has a first hierarchical ranking and the second participant a second hierarchical ranking, wherein the first hierarchical ranking is higher than the second hierarchical ranking, and wherein the indicator indicates the relative values of the first and second hierarchical rankings and wherein the contact organizer provides the hierarchical structure to at least the second participant during the live conference call.

11. The device of claim 10, wherein the indicator comprises the first and second hierarchical rankings and wherein the first and second hierarchical rankings are different from a corresponding title of each of the participants.

12. The device of claim 10, wherein the hierarchical structure is displayed to the second participant and wherein the hierarchical structure comprises an identity and title of each of the first and second participants.

13. The device of claim 10, wherein the hierarchical structure comprises a recommendation on the proper way to address the first participant.

14. The device of claim 10, wherein the hierarchical structure indicates when the first participant is speaking and when the first participant is not speaking.

15. The device of claim 10 wherein the organizer is further operable, during the live conference call, to provide simultaneously the hierarchical structure to the first participant.

16. The device of claim 10, wherein the organizer is operable, during the live conference call, to display a first hierarchical structure to the first participant and, during the live conference call, display a second hierarchical structure to the second participant, wherein the first and second hierarchical structures are different.

17. A communications network, comprising:
(a) network means for connecting first and second telecommunication devices to create a live conference call, the first and second telecommunication devices being associated, respectively, with first and second participants; and
(b) contact organizer means for:
(b1) determining characteristics of each of the first and second participants;
(b2) creating a hierarchal structure of the first and second participants based upon their determined characteristics, wherein the first participant has a first hierarchical ranking and the second participant a second hierarchical ranking, and wherein the hierarchical structure indicates the relative values of the first and second hierarchical rankings; and
(b3) during the live conference call, providing the hierarchical structure to at least the second participant.

18. The network of claim 17, wherein the hierarchical structure comprises the first and second hierarchical rankings, wherein the first and second hierarchical rankings are different from a corresponding title of each of the participants, wherein the hierarchical structure is displayed to the second participant, and wherein the hierarchical structure comprises an identity and title of each of the first and second participants.

19. The network of claim 18, wherein the hierarchical structure comprises a recommendation on the proper way to address the first participant.

20. The network of claim 17, wherein the hierarchical structure indicates when the first participant is speaking and when the first participant is not speaking and wherein, the organizer means, during the live conference call, simultaneously provides the hierarchical structure to the first participant.

* * * * *